UNITED STATES PATENT OFFICE.

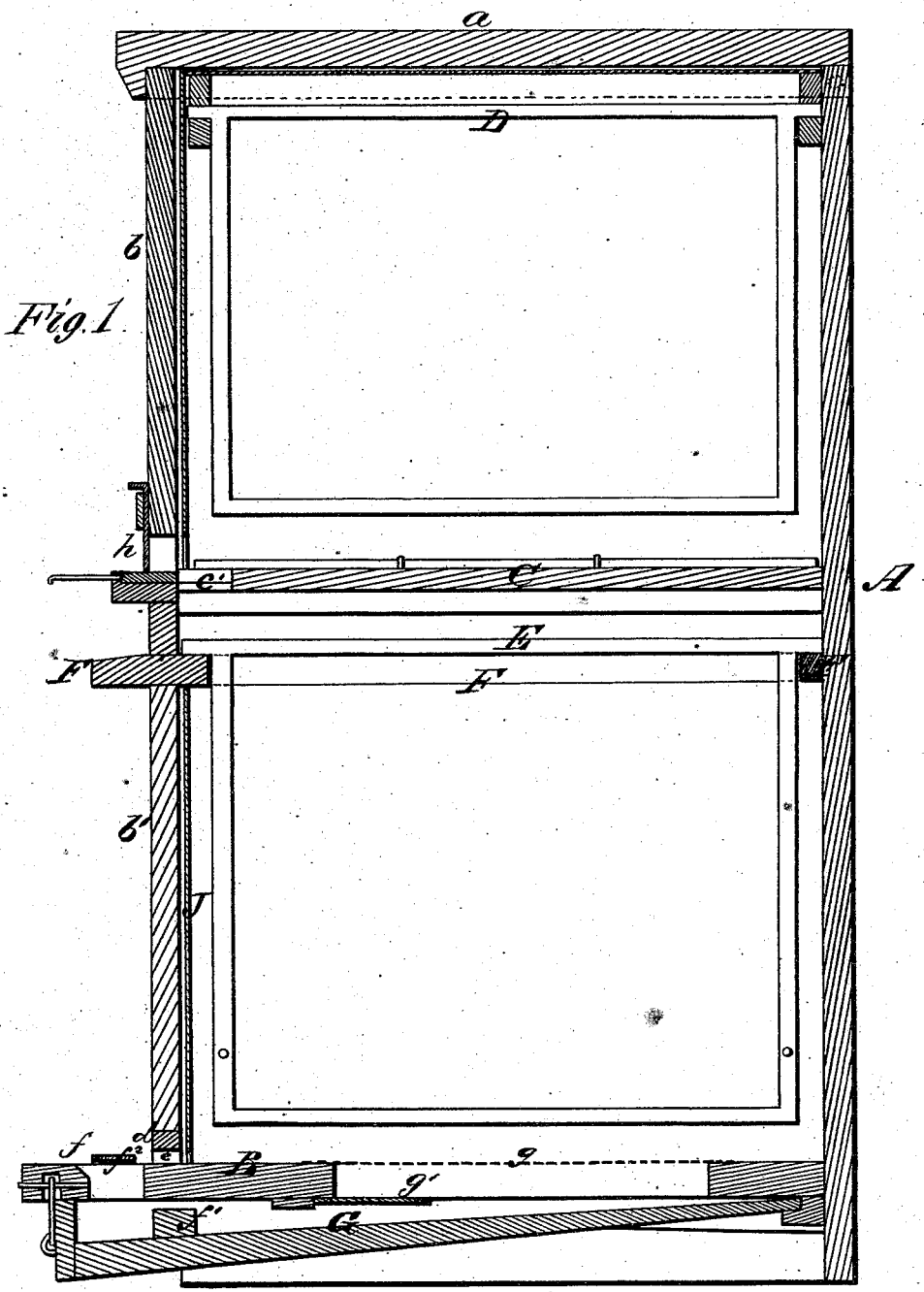

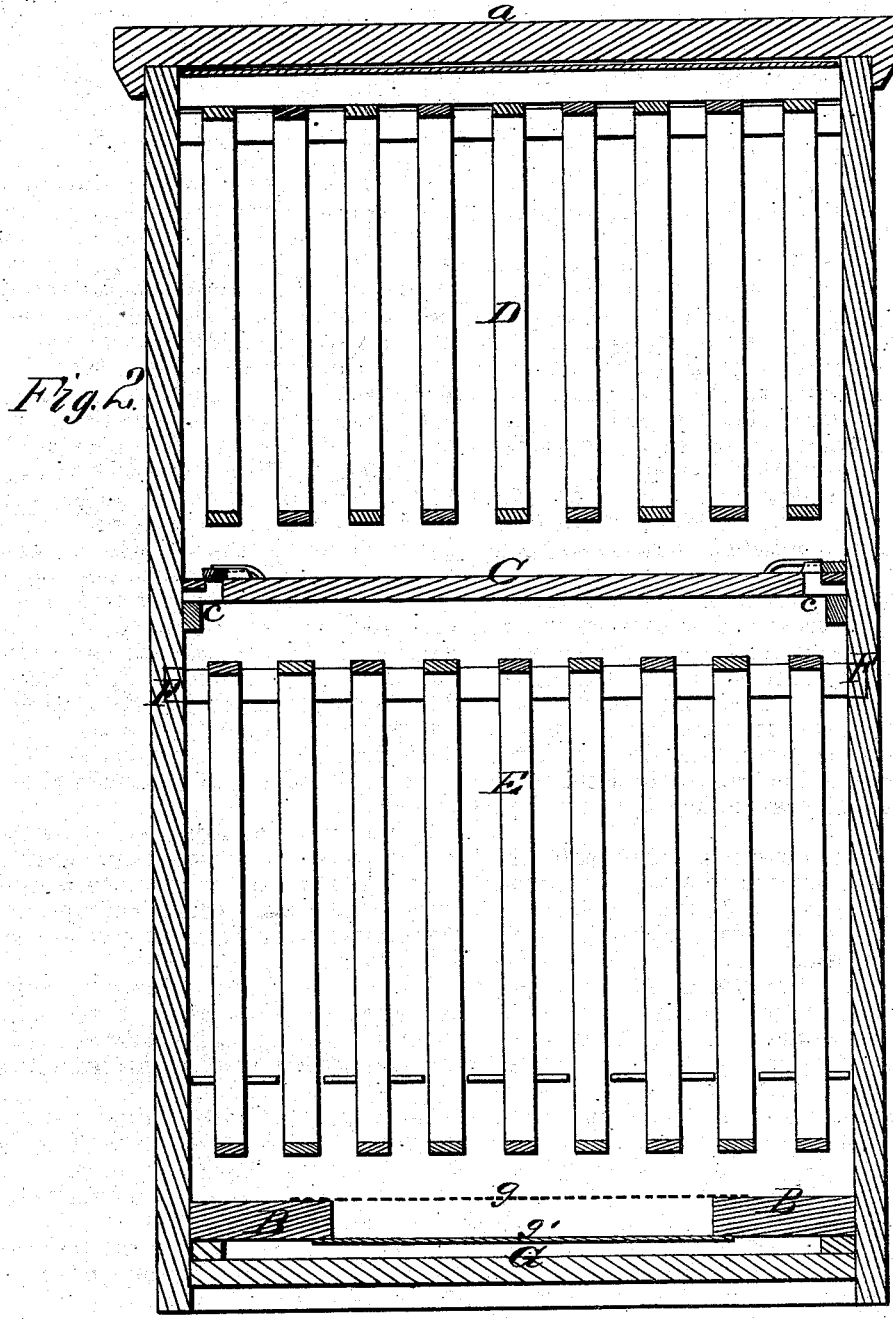

JOHN R. MOSELEY AND THOMAS J. MOSELEY, OF GREENFIELD, TENNESSEE.

IMPROVEMENT IN BEE-HIVES.

Specification forming part of Letters Patent No. 156,303, dated October 27, 1874; application filed June 27, 1874.

*To all whom it may concern:*

Be it known that we, JOHN ROBERT MOSELEY and THOMAS JEFFERSON MOSELEY, of Greenfield, in the county of Weakley and State of Tennessee, have invented a new and valuable Improvement in Bee-Hives; and we do hereby declare that the following is a full, clear, and exact description of the construction and operation of the same, reference being had to the annexed drawings making a part of this specification, and to the letters and figures of reference marked thereon.

Figure 1 of the drawing is a representation of a transverse vertical section of our bee-hive, and Fig. 2 is a longitudinal vertical sectional view of the same.

This invention has relation to bee-hives having movable frames; and it consists in providing hives of this description with a removable bottom, to which is applied a moth-entrance leading into a moth-trap, which is separated from the interior of the hive by means of a wire-cloth partition, whereby the moths are attracted into the trap by the scent of the bees, but cannot pass up into the hive from the trap.

In the annexed drawings, A designates the hive-box, which is provided with a hinged top, $a$, two hinged doors, $b$ $b'$, and a removable bottom, B. C designates a horizontal partition, which is removable, and which divides the hive-box into two apartments, the upper one of which is for the young brood when the partition is in its place, and the lower one is for the active workers. This partition is perforated at three points, $c$ $c$ $c'$, which perforations, when uncovered by their respective valves, allow the bees to ascend into the upper apartment. When the partition C is removed and the honey-frames E, which are in the brood-apartment, are lowered, so that their bottoms will be supported upon the tops of frames E in the lower apartment, the bees will make a solid hive. The lower frames E are suspended from a horizontal frame, F, which can be drawn out of the hive with all the frames E on it, when it is desired to inspect the bees and combs. Below the frames E is the removable bottom B, which projects from the hive beneath the door $b'$, to form a shelf for the bees. On this shelf a strip, $d$, is secured, which lies directly beneath the door $b'$ when this door is shut, and which has an opening, $e$, through it for the entrance and exit of the bees. In front of the entrance $e$ a passage, $f$, is made through the bottom B, leading down into a trap, G, in front of a cross-strip, $f^1$, and beneath a metal strip, $f^2$, which partly closes the opening $f$. In rear of the strip $f^1$ the trap is extended beneath a wire-cloth, $g$, which covers a large opening through the bottom B. The front portion of said opening has a metallic strip, $g'$, tacked across it, which lies beneath the wire-cloth $g$. The trap-drawer G can be removed from the bottom B when it is desired to remove moths from it.

In hiving the bees the bottom B is removed, and, after they are all hived, the bottom is returned to its place and the hive set away. The moth will, in almost every instance, enter through the opening $f$, and crawl into the trap-drawer beneath the wire-cloth $g$, where she will find the light, and where she will remain until taken out by removing the trap-drawer.

By removing the glass plate J, and sliding out the frames E, the bees can be inspected; or, if it is not desired to expose the bees in this way, they can be examined by taking out the frames D and partition C, and removing the bottom B.

The hive is robbed of honey by closing the passages $c$ $c$ $c'$, and raising a slide, $h$, which covers an opening through the door $b$.

What we claim as new, and desire to secure by Letters Patent, is—

The removable bottom B, provided with a bee-entrance, $e$, a moth-entrance, $f$, and a trap-drawer, G, in combination with the wire-cloth $g$, and strips $f^1$, $f^2$, and $g'$, substantially as described.

In testimony that we claim the above we have hereunto subscribed our names in the presence of two witnesses.

JOHN ROBERT MOSELEY.
THOM. JEFFERSON MOSELEY.

Witnesses:
ALPHEUS E. FISHER,
DAVAGE H. TUCKER.